United States Patent
Lee et al.

(10) Patent No.: US 12,062,793 B2
(45) Date of Patent: Aug. 13, 2024

(54) LITHIUM SECONDARY BATTERY AND METHOD OF PREPARING ANODE FOR LITHIUM SECONDARY BATTERY

(71) Applicant: SK ON CO., LTD., Seoul (KR)

(72) Inventors: Jong Hyuk Lee, Daejeon (KR); Dock Young Yoon, Daejeon (KR); Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 317 days.

(21) Appl. No.: 17/021,145

(22) Filed: Sep. 15, 2020

(65) Prior Publication Data

US 2021/0083293 A1 Mar. 18, 2021

(30) Foreign Application Priority Data

Sep. 16, 2019 (KR) .................. 10-2019-0113279

(51) Int. Cl.
*H01M 4/62* (2006.01)
*H01M 4/04* (2006.01)
*H01M 4/02* (2006.01)

(52) U.S. Cl.
CPC ......... *H01M 4/625* (2013.01); *H01M 4/0404* (2013.01); *H01M 2004/027* (2013.01)

(58) Field of Classification Search
CPC .......... H01M 4/62; H01M 4/362; H01M 2004/021; H01M 4/0404; H01M 2004/027; H01M 4/622; H01M 4/625; C01B 32/20; Y02E 60/10
See application file for complete search history.

(56) References Cited

U.S. PATENT DOCUMENTS

| | | | |
|---|---|---|---|
| 10,170,751 B2 | 1/2019 | Kachi | |
| 2013/0266865 A1* | 10/2013 | Kwon | H01M 4/624 429/231.5 |
| 2016/0293940 A1* | 10/2016 | Kinoshita | H01M 4/13 |
| 2018/0097229 A1* | 4/2018 | Jo | H01M 4/364 |
| 2018/0212277 A1 | 7/2018 | Park et al. | |
| 2019/0280291 A1* | 9/2019 | Pan | H01M 4/386 |

FOREIGN PATENT DOCUMENTS

| | | | |
|---|---|---|---|
| JP | 11312525 A | * | 11/1999 |
| JP | 200053408 A | | 2/2000 |
| JP | 2000203817 A | | 7/2000 |

(Continued)

OTHER PUBLICATIONS

English translation of JP11312525A.*

(Continued)

*Primary Examiner* — Cynthia H Kelly
*Assistant Examiner* — Monique M Wills
(74) *Attorney, Agent, or Firm* — The Webb Law Firm

(57) ABSTRACT

A lithium secondary battery according to exemplary embodiments includes a cathode, a separation layer, and an anode facing the cathode with the separation layer interposed therebetween. The anode includes an anode current collector, and an anode active material layer formed on the anode current collector. The anode active material layer includes an anode active material and a conductive additive. The conductive additive includes an expandable graphite having a particle diameter of 10 μm or less.

6 Claims, 4 Drawing Sheets

(56) References Cited

FOREIGN PATENT DOCUMENTS

| | | | | |
|---|---|---|---|---|
| JP | 2004146104 A | * | 5/2004 | |
| JP | 2004273424 A | * | 9/2004 | ........ H01M 10/0525 |
| JP | 5227483 B1 | | 7/2013 | |
| KR | 1020170099748 A | | 9/2017 | |

OTHER PUBLICATIONS

Modified translation JP2004146104A as taught by Oayama et al. (Year: 2004).*
Xiang et al; Graphene/nanosized silicon composites for lithium battery anodes with improved cycling stability (Year: 2011).*
JP-2004273424-A, english translation as taught by Hayashi (Year: 2004).*

* cited by examiner

LITHIUM SECONDARY BATTERY AND METHOD OF PREPARING ANODE FOR LITHIUM SECONDARY BATTERY

CROSS-REFERENCE TO RELATED APPLICATION

This application claims priority to Korean Patent Application No. 10-2019-0113279 filed Sep. 16, 2019, the disclosure of which is hereby incorporated by reference in its entirety.

BACKGROUND

1. Field

The present invention relates to a lithium secondary battery and a method of fabricating an anode for a lithium secondary battery. More particularly, the present invention relates to a lithium secondary battery including a graphite-based material and a method of fabricating an anode for the lithium secondary battery

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode, a separation layer (a separator), and an electrolyte immersing the electrode assembly. The lithium secondary battery may further include an outer case having, e.g., a pouch shape.

Recently, as an application of the lithium secondary battery has been expanded from a compact electronic device to a large-scaled device such as a hybrid vehicle, sufficient capacity and power may not be provided from the conventional lithium secondary battery.

For example, in the lithium secondary battery for an automobile, repeated charging and discharging operations are required due to a fast power consumption.

Thus, developments of a lithium secondary battery capable of maintaining mechanical and operational stability even when hundreds of charging and discharging cycles are repeated may be needed.

SUMMARY

According to an aspect of the present invention, there is provided an anode for a lithium secondary battery having improved charging and discharging properties.

According to exemplary embodiments, there is provided a method of fabricating an anode for a lithium secondary battery having improved charging and discharging properties.

According to an aspect of the present invention, there is provided a lithium secondary battery having improved charging and discharging properties.

A lithium secondary battery according to exemplary embodiments includes a cathode, a separation layer and an anode facing the cathode with the separation layer interposed therebetween. The anode includes an anode current collector and an anode active material layer formed on the anode current collector. The anode active material layer includes an anode active material and a conductive additive. The conductive additive includes an expandable graphite having a particle diameter of 10 μm or less.

In some embodiments, the particle diameter of the expandable graphite may be in a range from 1 μm to 7 μm.

In some embodiments, an expansion ratio of the expandable graphite may be from 150% to 500%.

In some embodiments, the anode active material may include natural graphite and artificial graphite.

In some embodiments, the anode active material layer may further include at least one of a carbon-based conductive agent and a metal-based conductive agent.

In some embodiments, an amount of the expandable graphite may be in a range from 1 wt % to 8 wt % based on a total weight of the anode active material layer.

In some embodiments, the anode active material layer may include pores formed by an elastic deformation of the expandable graphite.

In some embodiments, a porosity of the anode active material layer may be from 17% to 29%.

In some embodiments, a density of the anode active material layer is from 1.4 g/cc to 1.9 g/cc.

In a method of fabricating an anode for a lithium secondary battery according to exemplary embodiments, a graphite particle including natural graphite or artificial graphite may be grinded to have a particle diameter of 10 μm or less. The grinded graphite particle may be acid-treated. The acid-treated graphite particle may be washed and dried to prepare an expandable graphite. The expandable graphite may be with an anode active material to prepare an anode slurry. The anode slurry may be coated on a current collector to form an anode active material layer.

In some embodiments, the acid-treated graphite particle may be heated before washing and drying.

In some embodiments, in the formation of the anode active material layer, the anode slurry coated on the current collector may be dried. The dried anode slurry may be pressed.

In some embodiments, an expansion ratio of the expandable graphite before pressing may be 500% or less, and an expansion ratio of the expandable graphite after pressing may be from 110% to 300%.

In some embodiments, the expandable graphite may be included by an amount of 1 wt % to 8 wt % based on a solid content of the anode slurry.

According to exemplary embodiments of the present invention, an anode active material layer may include an expandable graphite having a particle diameter of 10 μm or less. The expandable graphite may have a predetermined an elastic force, and may form voids in the anode active material layer while being elastically recovered after being pressed in an anode forming process. The voids may effectively serve as an impregnation path for an electrolyte and an ion flow path.

In exemplary embodiments, the expandable graphite may be formed by using graphite particles having a particle diameter of 10 μm or less and may be used as a conductive additive for an anode. Accordingly, the voids may be effectively formed in the anode active material layer, and cycle properties of a lithium secondary battery may be improved.

DETAILED DESCRIPTION OF THE EMBODIMENTS

According to exemplary embodiments of the present invention, a lithium secondary battery including a cathode, a separation layer and an anode that may contain an expandable graphite having a particle diameter of 10 μm or less is provided. A method of fabricating an anode for a lithium secondary battery is also provided. The lithium secondary battery may have improved charging and discharging properties.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
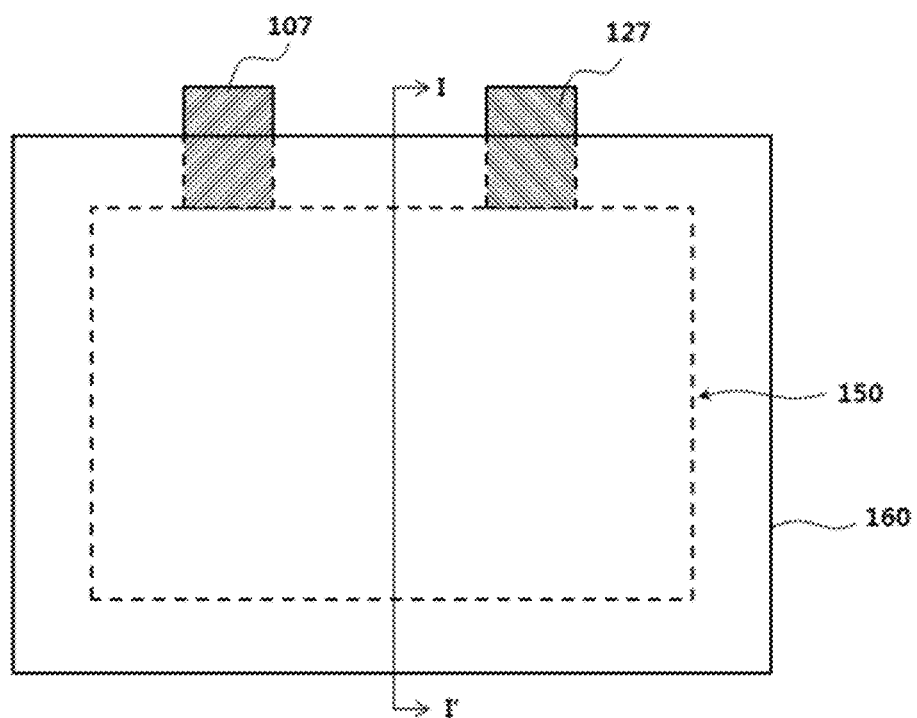
FIG. 1 is a top planar view illustrating a lithium secondary battery in accordance with exemplary embodiments.
Figure 2:
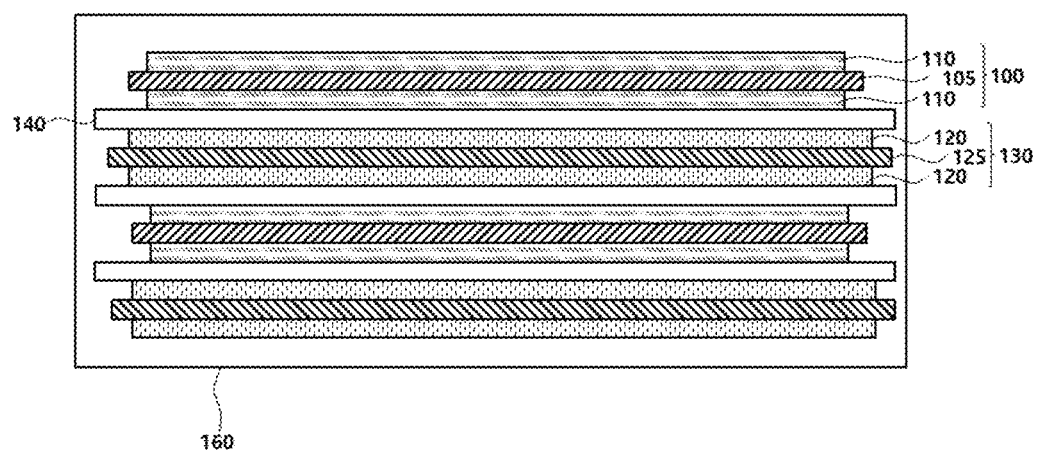
FIG. 2 is a cross-sectional view illustrating a lithium secondary battery in accordance with exemplary embodiments.

FIGS. 1 and 2 are a schematic top planar view and a schematic cross-sectional view, respectively, illustrating a lithium secondary battery in accordance with exemplary embodiments. For example, FIG. 2 is a cross-sectional view taken along a line I-I' of FIG. 1 in a thickness direction of the lithium secondary battery.

In FIGS. 1 and 2, two directions perpendicular to each other on a plane are defined as a first direction and a second direction. For example, the first direction may be a length direction of the lithium secondary battery, and the second direction may be a width direction of the lithium secondary battery.

For convenience of description, illustration of a cathode and an anode in FIG. 1 is omitted.

Referring to FIGS. 1 and 2, a lithium secondary battery may include an electrode assembly 150 and a case 160 accommodating the electrode assembly 150. The electrode assembly 150 may include a cathode 100, an anode 130 and a separation layer 140.

The cathode 100 may include a cathode current collector 105 and a cathode active material layer 110 formed on at least one surface of the cathode current collector 105. In exemplary embodiments, the cathode active material layer 110 may be formed on both surfaces (e.g., an upper surface and a lower surface) of the cathode current collector 105. For example, the cathode active material layer 110 may be coated on each of the upper and lower surfaces of the cathode current collector 105, and may be directly coated on a surface of the cathode current collector 105.

The cathode current collector 105 may include stainless-steel, nickel, aluminum, titanium, copper or an alloy thereof. Preferably, aluminum or an alloy thereof may be used.

The cathode active material layer 110 may include a lithium metal oxide as a cathode active material. In exemplary embodiments, the cathode active material layer 110 may include a lithium (Li)-nickel (Ni)-based oxide.

In some embodiments, the lithium metal oxide included in the cathode active material layer 110 may be represented by Chemical Formula 1 below.

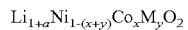  [Chemical Formula 1]

$$Li_{1+\alpha}Ni_{1-(x+y)}Co_xM_yO_2$$

In Chemical Formula 1, $-0.05 \leq \alpha \leq 0.15$, $0.01 \leq x \leq 0.2$, $0 \leq y \leq 0.2$ and M may include at least one selected from the group consisting of Mg, Sr, Ba, B, Al, Si, Mn, Ti, Zr and W. In an embodiment, $0.01 \leq x \leq 0.20$ and $0.01 \leq y \leq 0.15$ in Chemical Formula 1

Preferably, in Chemical Formula 1, M may be manganese (Mn). In this case, a nickel-cobalt-manganese (NCM)-based lithium oxide may be used as the cathode active material.

For example, nickel (Ni) may serve as a metal related to a capacity of the lithium secondary battery. As an amount of nickel becomes higher, capacity and power of the lithium secondary battery may be improved. However, an excessive amount of nickel may degrade of a life-span of the battery, and may be disadvantageous in an aspect of mechanical and electrical stability of the battery. For example, cobalt (Co) may serve as a metal related to a conductivity or a resistance of the lithium secondary battery. In an embodiment, M includes manganese (Mn), and Mn may serve as a metal related to the mechanical and electrical stability of the lithium secondary battery.

High Capacity and power, low resistance, and life-span stability from the cathode active material layer 110 may be commonly improved through an interaction of nickel, cobalt and manganese as described above.

For example, the cathode active material may be mixed and stirred together with a binder, a conductive agent and/or a dispersive additive in a solvent to form a slurry. The slurry may be coated on the cathode current collector 105, and dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be improved.

The conductive agent may be added to facilitate electron mobility between active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In some embodiments, an electrode density of the cathode may be in a range from 3.0 g/cc to 3.9 g/cc, preferably from 3.2 g/cc to 3.8 g/cc.

In exemplary embodiments, the cathode active material layer 110 may have a multi-layered structure.

The anode 130 may include an anode current collector 125 and an anode active material layer 120 formed on at least one surface of the anode current collector 125. In exemplary embodiments, the anode active material layer 120 may be formed on both surfaces (e.g., an upper surface and a lower surface) of the anode current collector 125. For example, the anode active material layer 120 may be coated on each of the upper and lower surfaces of the anode current collector 125, and may be directly coated on a surface of the anode current collector 125.

The anode current collector 125 may include gold, stainless-steel, nickel, aluminum, titanium, copper or an alloy thereof, preferably, may include copper or a copper alloy.

In exemplary embodiments, the anode active material layer 120 may include an expandable graphite.

The expandable graphite may refer to a material formed by expanding natural graphite or artificial graphite by a predetermined volume. The expandable graphite may be formed by a heat treatment after intercalating an acid between layers of a natural graphite or artificial graphite crystal structure. The acid may be rapidly discharged during the heat treatment so that an interlayer bond in graphite may be at least partially destroyed by an expansion pressure.

When natural graphite or artificial graphite is exposed to the acid, the acid may penetrate between layers in a layered structure of graphite. The interlayer bond of graphite may be at least partially weakened by the penetrating acid. An overall volume of graphite may be increased due to the expansion pressure of an acid vapor generated when the penetrated acid is discharged during the rapid heat treatment through an edge of an interlayer space. The expanded graphite may be washed and dried to obtain the expandable graphite.

A particle diameter of the expandable graphite included in the anode active material layer 120 may be 10 μm or less.

If the particle diameter of the expandable graphite exceeds 10 μm, a distance between an outer edge (an edge portion or an edge site) and a center of a graphite particle may be increased. In this case, the expansion pressure of the acid vapor may become greater, because an area of the edge site is small compared to an area of a graphite layer in the heat treatment for discharging the acid inserted between the graphite layers. Thus, the graphite particle may be expanded excessively, and the interlayer bond may be excessively damaged. The excessively expanded graphite particle may be substantially completely deformed, thereby resulting in, e.g., a loss of elasticity.

In exemplary embodiments, the particle diameter of the expandable graphite may be 10 μm or less. In this case, the area of the edge portion serving as an outlet of the acid vapor relative to the area of layers of the graphite crystal may be adjusted to an appropriate range. Thus, the expansion pressure of the acid vapor may become relatively small during the heat treatment, so that a degree of an expansion of the graphite particle may be maintained at an appropriate level and the interlayer bonding of the graphite crystal may also be properly maintained. Additionally, the expandable graphite may have an elasticity. For example, the expandable graphite according to exemplary embodiments may be restored to an original expanded form when a pressure below a threshold value is applied and removed.

Preferably, the particle diameter of the expandable graphite may be in a range from 3 μm to 7 μm, or from 5 μm to 7 μm. Within this range, the elasticity of the expandable graphite may be improved. If the particle diameter is less than 3 μm, an elasticity recovery may not be realized because graphite may not be substantially expanded.

In exemplary embodiments, the particle diameter of the expandable graphite may refer to a volume median diameter (D50) of the expandable graphite particle.

The expandable graphite may be pressed in the formation of the anode active material layer 120, and the volume may be decreased during the pressing. When the pressing is completed, the volume of the expandable graphite may be increased due to an elastic deformation that may be referred to as a spring back (SB) phenomenon. Pores may be formed in the anode material layer 120 by the elastic deformation. The pores may be provided as, e.g., an electrolyte penetration path. Accordingly, the anode active material may be more evenly impregnated in the electrolyte, and ions of the electrolyte may be easily moved through the pores.

In exemplary embodiments, an expansion ratio of the expandable graphite may be from 150% to 500% relative to a state before the expansion (e.g., before an acid treatment). The term "expansion ratio" used herein may refer to a percentage of a volume of the expandable graphite after deformation by the expansion and/or pressing relative to a volume before the expansion. Within the range of the expansion ratio, the pores having a proper volume may be formed in the anode active material layer 120. For example, if the expansion ratio is less than the above range, the pores may be formed insufficiently. If the expansion ratio exceeds the above range, the anode active material layer 120 may be excessively deformed, an adhesion between the anode active material layer 120 and the anode current collector 125 may be weakened, or an operational stability of the lithium secondary battery may be degraded.

In exemplary embodiments, the expandable graphite may be included in an amount from 1 weight percent (wt %) to 8 wt % based on a total weight of the anode active material layer 120. If the amount of the expandable graphite is less than the above range, the pores may be formed insufficiently. Accordingly, power and life-span of the lithium secondary battery may be degraded. If the amount of the expandable graphite exceeds the above range, the pores may be excessively formed. Accordingly, a volume of the anode active material layer 120 may be excessively increased, and mechanical and chemical operation stability may be also decreased to degrade life-span property. Preferably, the expandable graphite may be included in an amount from 1 wt % to 6 wt %, from 1 wt % to 5 wt %, from 2 wt % to 5%, or from 3 wt % to 5 wt % based on the total weight of the anode active material layer 120.

In a fabrication of the expandable graphite according to exemplary embodiments, graphite particles may be grinded to have a particle diameter of 10 μm or less. The graphite particles may include natural graphite or artificial graphite.

The grinded graphite particles may be acid-treated. In this case, nitric acid or sulfuric acid may be used, and a mixed acid of nitric acid and sulfuric acid may be preferably used. Nitric acid or sulfuric acid molecules may be intercalated between crystal layers of the grinded graphite particles.

The acid-treated graphite particles may be heat-treated after a first washing/drying. The graphite particles may be expanded and fixed by the heat treatment. The heat treatment may be performed at a temperature from 500° C. to 1200° C. The expansion ratio of the expandable graphite may be controlled by adjusting the temperature.

A second washing and drying may be performed to the acid-treated graphite particles or the heat-treated graphite particles. Accordingly, the acid molecules intercalated between the layers of the graphite crystal may be released, and the expandable graphite according to exemplary embodiments may be obtained.

When the graphite particle having a particle diameter greater than 10 μm is expanded, and then grinded to a particle diameter of 10 μm or less, a degree of the expansion of the graphite particle may be excessively increased. Accordingly, a loss of an elasticity may be caused in the expanded graphite. Further, when the expanded graphite is grinded, a delamination causing a separation of a weakened interlayer bond may occur instead of the grinding that may induce a breakage of a covalent bonding in a 2-dimensional graphite network structure, or an agglomeration of the delaminated graphite may occur. Thus, particles having a dimension greater than 10 μm (large-scaled particles) that may not be grinded to a desired size may be still present. The large-scaled particles may degrade dispersive property when preparing an electrode slurry, and the elastic deformation may not occur in the large-scaled particles. The large-scaled particle may also cause a closing or filling of the pores in the anode active material layer.

In exemplary embodiments, the anode active material layer 120 may include an anode active material that may be capable of absorbing and releasing lithium ions.

The anode active material may include at least one of a carbon-based active material, a silicon-based active material and a lithium composite active material.

The carbon-based active material may include at least one of natural graphite, artificial graphite, hard carbon, soft carbon, carbon nanotube, carbon fiber, cokes and pitch. Artificial graphite and hard carbon may include a primary particle and/or a secondary particle shape. Preferably, natural graphite and/or artificial graphite may be used as the anode active material.

Artificial graphite has a relatively enhanced life-span property compared to that of natural graphite. Natural graphite has a large specific surface area compared to that of artificial graphite, and thus has a relatively low resistance to be advantageous from an aspect of improving power.

In an embodiment, a particle size or crystal size of the carbon-based active material may be from about 5 μm to about 30 μm.

In exemplary embodiments, the silicon-based active material may include silicon, silicon oxide, a silicon-carbon composite, a silicon oxide-carbon composite or a silicon-silicon oxide-carbon composite. The lithium composite active material may include lithium titanate (LTO).

For example, the expandable graphite and the anode active material may be mixed and stirred in a solvent with a binder, a conductive agent, and/or a dispersive agent to prepare an anode slurry. The anode slurry may be coated on the anode current collector 125, and then dried and pressed to form the anode active material layer 120.

In exemplary embodiments, the expandable graphite may be included in an amount from 1 wt % to 8 wt % based on a solid content of the anode slurry. If the amount of the expandable graphite is less than the above range, the pores may be formed insufficiently. Accordingly, power and efficiency of the lithium secondary battery may be degraded. If the amount of the expandable graphite exceeds the above range, the pores may be excessively formed. Accordingly, mechanical and chemical operation stability of the anode active material layer 120 may be degraded, and the life-span may be decreased. Preferably, the expandable graphite may be included in an amount from 1 wt % to 6 wt %, from 1 wt % to 5 wt %, from 2 wt % to 5 wt %, or from 3 wt % to 5 wt % based on the solid content of the anode slurry.

In exemplary embodiments, the expansion ratio of the expandable graphite before pressing may be from 150% to 500% relative to a volume before expansion. Further, the expansion ratio after pressing may be from 110% to 300% relative to the volume before expansion. The "expansion ration before pressing" and "expansion ratio after pressing" may refer to a volume ratio (percentage) of graphite relative to the volume before expansion. If the expansion ratios before and after pressing is within the above range, the anode active material may be effectively impregnated, and the electrolyte and ions may be transferred effectively. Additionally, an internal bonding force of the anode active material layer 120 and the adhesion between the anode active material layer 120 and the current collector 125 may be maintained.

The binder and the conductive agent substantially the same as or similar to those for the cathode 100 as mentioned above may be used. In some embodiments, the binder for the anode 130 may include an aqueous binder such as styrene-butadiene rubber (SBR) or an acryl-based binder that may be used with a thickener such as carboxymethyl cellulose (CMC) so that compatibility with the carbon-based active material may be improved.

For example, the anode active material layer 120 and/or the anode slurry may contain a conductive additive. The expandable graphite according to exemplary embodiments may be provided as the conductive additive.

In exemplary embodiments, the anode active material layer 120 may have a porosity from 17% to 29%. For example, as the expandable graphite according to exemplary embodiments is restored after pressing of the anode active material layer 120, the porosity of the anode active material layer 120 may be adjusted within the above range. If the porosity is less than the above range, the impregnation of the anode active material with the electrolyte and the formation of a flow path of the electrolyte and ions may be insufficient. If the porosity exceeds the above range, mechanical and chemical operation stability of the anode active material layer 120 may be deteriorated. Preferably, the porosity may be from 18 to 29%, from 19 to 24%, or from 21 to 24%.

In exemplary embodiments, a density of the anode active material layer 120 may be from 1.4 g/cc to 1.9 g/cc. If the density is less than 1.4 g/cc, power and capacity of the lithium secondary battery may be decreased. If the density exceeds 1.9 g/cc, as excessive stress may be applied to the expandable graphite during the pressing to cause a loss of the elasticity of the expandable graphite. Thus, the pores formed by the elastic deformation of the expandable graphite may not be generated. Preferably, the density of the anode active material layer 120 may be from 1.5 g/cc to 1.8 g/cc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation to further enhance power and capacity.

In exemplary embodiments, the anode active material layer 120 may have a multi-layered structure.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

The separation layer 140 may extend between the cathode 100 and the anode 130, and may be folded and wound along a thickness direction of the lithium secondary battery. Accordingly, a plurality of the cathodes 100 and the anodes 130 may be stacked in the thickness direction via the separation layer 140.

In exemplary embodiments, an electrode cell may be defined by the cathode 100, the anode 130 and the separation layer 140, and a plurality of the electrode cells may be stacked to form the electrode assembly 150. The electrode assembly 150 may have e.g., a jelly roll shape.

The electrode assembly 150 may be accommodated in the case 160, and the electrolyte may be injected into the case. The case 160 may include, e.g., a pouch, a can, etc.

In exemplary embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3CF_2SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode current collector 125 included in each electrode cell to extend to a side of the case 160. The electrode tabs may be welded together with the side of the case 160 to form an electrode lead (a cathode lead 107 and an anode lead 127) extending or protruding to an outside of the case 160.

FIG. 1 illustrates that the cathode lead 107 and the anode lead 127 are formed at the same side of the case 160 or the lithium secondary battery. However, the cathode lead 107 and the anode lead 127 may be formed at opposite sides of the case 160 or the lithium secondary battery.

For example, the cathode lead 107 may be formed at one end of the case 160, and the anode lead 127 may be formed at the other end of the case 160.

The lithium secondary battery may be manufactured in, e.g., a cylindrical shape using a can, a square shape, a pouch type, a coin type, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims Preparation Example: Preparation of Micro-Expandable Graphite Natural graphite was grinded to an average particle diameter of 5 μm, and then immersed in a mixed acid solution of 9:1 sulfuric acid and nitric acid at a temperature of 25° C. for 2 hours. The acid-treated graphite was filtered to remove the acid solution and washed once with deionized water to prepare a wet powder. Subsequently, the wet powder was rapidly heated at 900° C. in a microwave oven, washed with water and dried to prepare a micro-expandable graphite having a volume ratio of about 400% compared to a volume before expansion.

Examples 1-4

(1) Fabrication of Anode

The micro expandable graphite of the above-described Preparation Example was used as a conductive additive, and 92 wt % of spherical natural graphite as an anode active material, 1.8 wt % of SBR-based binder, 1.2 wt % of CMC as a thickener and 5 wt % of a flake type amorphous graphite as a conductive agent were mixed to form an anode slurry. The micro expandable graphite of Preparation Example was included by an amount as shown in Table 1 below. Amounts of the anode active material and the conductive agent were modified by the amount of the expandable graphite. The anode slurry was coated on a copper substrate, dried and pressed to a density of 1.7 g/cc to obtain an anode plate having a thickness of 70 μm.

(2) Preparation of Cathode

A cathode slurry was prepared by mixing $LiNi_{0.8}Co_{0.1}Mn_{0.1}O_2$ as a cathode active material, carbon black as a conductive agent and PVDF as a binder by a weight ratio of 92:5:3. The cathode slurry was coated, dried, and pressed on an aluminum substrate to form a cathode plate.

(3) Fabrication of Secondary Battery

The cathode and the anode obtained as described above were disposed with a polyethylene separator (25 μm) interposed therebetween to form an electrode cell, and the electrode cells were stacked to form an electrode assembly. The electrode assembly was inserted in a pouch and electrode tab portions were welded. An electrolyte was injected to form a secondary battery.

The electrolyte was prepared by dissolving 1M $LiPF_6$ in a mixed solvent of ethylene carbonate/ethyl methyl carbonate/diethyl carbonate (EC/EMC/DEC) (25/45/30; volume ratio), and then 1 wt % of vinylene carbonate, 0.5 wt % of 1,3-propensultone (PRS) and 0.5 wt % of lithium bis(oxalato) borate (LiBOB) were added.

Examples 5-8

Expandable graphites were prepared by the same method as that of Preparation Example except that natural graphites having an average diameter of 1 μm and 7 μm were used. The expandable graphites were used as conductive additives to obtain secondary batteries by the same method as that of Example 1.

Comparative Examples 1 to 5

Plate-shaped Natural graphite or Super P (carbon black) was used instead of the micro expandable graphite by an amount as shown in Table 1, and lithium secondary batteries were fabricated by the same method as that of Example 1.

Comparative Example 6

An expandable graphite was prepared by the same method as that of Preparation Example except that the expandable graphite (an expansion ratio was about 800%) was prepared from natural graphite having an average diameter of 20 μm. The expandable graphite was used as a conductive additive to obtain a secondary battery by the same method as that of Example 1.

Experimental Example

(1) SEM (Scanning Electron Microscopy) Image Evaluation

Figure 3:
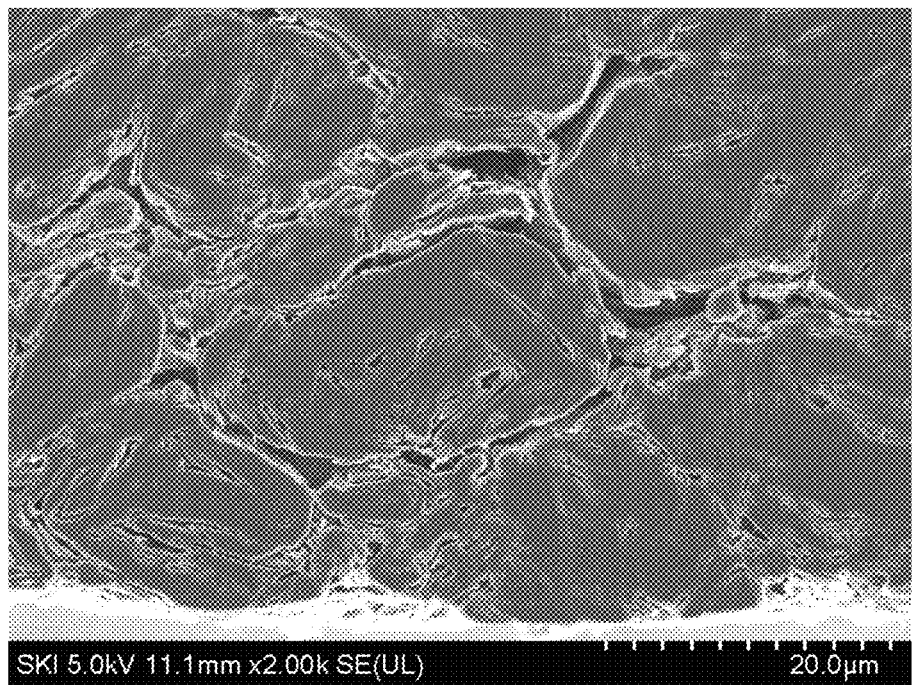
FIG. 3 is a scanning electron microscopy (SEM) image showing a cross-section of an anode active material layer in accordance with exemplary embodiments.
Figure 4:
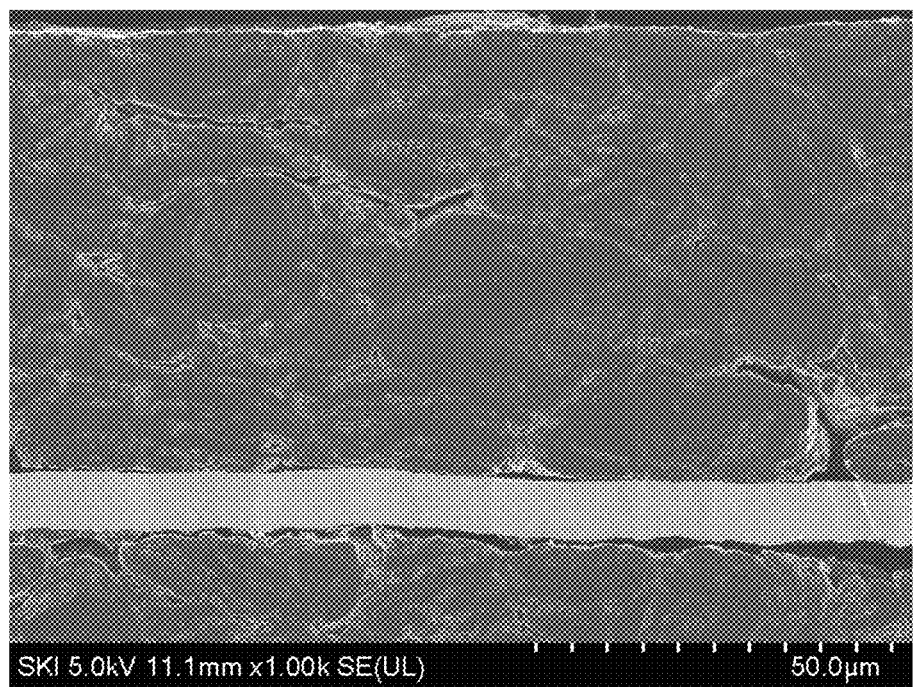
FIG. 4 is an SEM image showing a cross-section of an anode active material layer in accordance with a comparative example.

The anodes of Example 3 and Comparative Example 3 were cut along a thickness direction, and SEM images of cross-sections were obtained as shown in FIGS. 3 and 4.

Referring to FIG. 3, a sufficient amount of pores were formed by an elastic deformation of the expandable graphite after pressing.

Referring to FIG. 4, in the anode of Comparative Example 3 pressed with the density of 1.7 gg/cc, flow paths penetrating the anode active material were substantially closed, and pores were not formed.

(2) Measurement of Porosity

Porosities of the anodes of Examples and Comparative Examples were measured. The porosity was measured using AutoPore V 9600 Mercury Intrusion Porosimeter (AutoPore V 9600 Mercury Intrusion Porosimeter) under conditions as described below.

i) sample weight: 1 g±0.1 g
ii) electrode sampling: 1 cm×5 cm suitable for the sample weight
iii) measuring media: mercury
iv) measuring condition: from 0.2 psig to 33,000 psig around 150 points
iv) mercury pressing interval: 10 seconds
v) mercury contact angle: 130 degree

(3) Measuring Initial Efficiency

A charging (CC/CV 0.5 C 4.3V 0.05CA CUT-OFF) and a discharging (CC 1.0 C 3.0V CUT-OFF) were performed using the secondary batteries of Examples and Comparative Examples, and an initial charging/discharging capacity was measured. Further, an initial reversible capacity/an irreversible capacity and an efficiency were calculated.

(4) Evaluation of Capacity Retention 200 cycles and 250 cycles of a charging (1 C 4.2V 0.1 C CUT-OFF) and a discharging (1 C 3.0V CUT-OFF) were repeated using the secondary batteries of Examples and Comparative Examples. A first discharging capacity was denominated by each of the 200th discharging capacity and the 250th discharging capacity to evaluate life-span retentions as percentage values.

The results are shown in Table 1 below. In the Table 1 below, Example is abbreviated as "Ex.", and Comparative Example is abbreviated as "Com."

TABLE 1

| | Conductive Additive (diameter) | Added Amount (wt. %) | Porosity (%) | Initial reversible capacity (mAh/g) | Initial irreversible capacity (mAh/g) | Initial Efficiency (%) | Capacity Retention (%) @200 cycle | Capacity Retention (%) @250 cycle |
|---|---|---|---|---|---|---|---|---|
| Ex. 1 | Micro | 1 | 19.8 | 362.4 | 25.9 | 93.3 | 96.5 | 94.1 |
| Ex. 2 | expandable | 3 | 21.4 | 363.2 | 26 | 93.3 | 97.4 | 95.1 |
| Ex. 3 | graphite | 5 | 23.7 | 363.9 | 26.4 | 93.2 | 97.5 | 95 |
| Ex. 4 | (5 μm) | 8 | 28.2 | 365.1 | 30.8 | 92.2 | 96.6 | 93.2 |
| Ex. 5 | Micro | 3 | 17.8 | 359.4 | 29.4 | 92.4 | 96.2 | 91.5 |
| Ex. 6 | expandable graphite (1 μm) | 5 | 18.2 | 359.8 | 31.5 | 91.9 | 96.5 | 92.4 |
| Ex. 7 | Micro expandable graphite (7 μm) | 3 | 21.8 | 362.3 | 25.4 | 93.4 | 97.3 | 94.8 |
| Com. 1 | Common plate-type | 1 | 14.5 | 361.9 | 25.4 | 93.4 | 93 | 84.9 |
| Com. 2 | graphite | 3 | 15.1 | 361.6 | 25.8 | 93.3 | 92.6 | 86.7 |
| Com. 3 | | 5 | 15.5 | 361.4 | 26.3 | 93.2 | 93.2 | 88.3 |
| Com. 4 | Super P | 1 | 14.4 | 360.8 | 25.3 | 93.5 | 93.4 | 85.1 |
| Com. 5 | | 3 | 14.5 | 358.3 | 31.3 | 91.97 | 94.6 | 83.2 |
| Com. 6 | Micro expandable graphite (20 μm) | 5 | 14.6 | 356.2 | 30.4 | 92.1 | 91.1 | 74.2 |

Referring to Table 1 above, in Examples using the micro expandable graphite prepared from graphite having a diameter of 10 μm or less as the conductive additive, the secondary batteries having improved life-span properties were obtained.

What is claimed is:

1. A lithium secondary battery, comprising:
   a cathode;
   a separation layer; and
   an anode facing the cathode with the separation layer interposed therebetween, wherein the anode comprises:
      an anode current collector; and
      an anode active material layer formed on the anode current collector, the anode active material layer including an anode active material including natural graphite or artificial graphite and a conductive additive,
   wherein a particle size of the anode active material is from about 5 μm to about 30 μm,
   wherein the conductive additive includes an expandable graphite having a particle diameter of 5 μm to 10 μm,
   wherein a porosity of the anode active material layer is from 19% to 24%, and
   wherein the expandable graphite is in an expanded state, and an amount of the expandable graphite is in a range from 1 wt % to % 5 wt % based on a total weight of the anode active material layer.

2. The lithium secondary battery according to claim 1, wherein the particle diameter of the expandable graphite is in a range from 5 μm to 7 μm.

3. The lithium secondary battery according to claim 1, wherein an expansion ratio of the expandable graphite is from 150% to 500%.

4. The lithium secondary battery according to claim 1, wherein the anode active material layer further includes at least one of a carbon-based conductive agent and a metal-based conductive agent.

5. The lithium secondary battery according to claim 1, wherein the anode active material layer includes pores formed by an elastic deformation of the expandable graphite.

6. The lithium secondary battery according to claim 1, wherein a density of the anode active material layer is from 1.4 g/cc to 1.9 g/cc.

* * * * *

UNITED STATES PATENT AND TRADEMARK OFFICE
CERTIFICATE OF CORRECTION

| | | |
|---|---|---|
| PATENT NO. | : 12,062,793 B2 | Page 1 of 1 |
| APPLICATION NO. | : 17/021145 | |
| DATED | : August 13, 2024 | |
| INVENTOR(S) | : Jong Hyuk Lee et al. | |

It is certified that error appears in the above-identified patent and that said Letters Patent is hereby corrected as shown below:

In the Claims

Column 13, Line 1, Claim 1, delete "to %" and insert -- to --

Signed and Sealed this
Twenty-ninth Day of October, 2024

Katherine Kelly Vidal
*Director of the United States Patent and Trademark Office*